(12) United States Patent
Ketteridge

(10) Patent No.: US 8,660,155 B2
(45) Date of Patent: Feb. 25, 2014

(54) METHOD AND APPARATUS FOR COOLING SEMICONDUCTOR PUMPED LASERS

(75) Inventor: Peter A. Ketteridge, Amherst, NH (US)

(73) Assignee: BAE Systems Information and Electronics Systems Integration Inc., Nashua, NH (US)

( * ) Notice: Subject to any disclaimer, the term of this patent is extended or adjusted under 35 U.S.C. 154(b) by 887 days.

(21) Appl. No.: 11/346,648

(22) Filed: Feb. 3, 2006

(65) Prior Publication Data
US 2007/0183467 A1 Aug. 9, 2007

(51) Int. Cl.
*H01S 3/04* (2006.01)

(52) U.S. Cl.
USPC ............... 372/36; 372/34; 372/35; 372/66; 372/67; 372/68

(58) Field of Classification Search
USPC ...................................... 372/34–36
See application file for complete search history.

(56) References Cited

U.S. PATENT DOCUMENTS

| | | | |
|---|---|---|---|
| 5,363,391 A * | 11/1994 | Matthews et al. | 372/36 |
| 5,846,638 A * | 12/1998 | Meissner | 428/220 |
| 6,201,695 B1 * | 3/2001 | Duesman et al. | 361/703 |
| 6,330,256 B1 * | 12/2001 | Byren et al. | 372/21 |
| 6,667,999 B2 * | 12/2003 | Hasson et al. | 372/36 |
| 2003/0063638 A1 * | 4/2003 | Hasson et al. | 372/36 |
| 2004/0032891 A1 * | 2/2004 | Ikeda et al. | 372/43 |
| 2004/0042381 A1 * | 3/2004 | Miyamoto et al. | 369/275.4 |
| 2006/0023277 A1 * | 2/2006 | Clar et al. | 359/9 |
| 2006/0114951 A1 * | 6/2006 | Chou et al. | 372/33 |
| 2007/0036194 A1 * | 2/2007 | Govorkov et al. | 372/57 |

OTHER PUBLICATIONS

M. Lazard et al, "Diffusivity measurement of semi-transparent media: model of the coupled transient heat transfer and experiments on glass, silica glass and zinc selenide" International Journal of Heat and Mass Transfer 47 (2004) 477-487.*

* cited by examiner

*Primary Examiner* — Yuanda Zhang
(74) *Attorney, Agent, or Firm* — Yudell Isidore Ng Russell; Antony Ng

(57) ABSTRACT

A laser system having a cooling apparatus is disclosed. The laser system includes a resonator, a gain medium and multiple heat-absorbing discs. The resonator is formed by a first mirror and a second mirror. The gain medium, which is contained within the resonator, is collectively formed by a group of gain medium segments. Each of the gain medium segments is preferably in the shape of a cylindrical disc. The heat-absorbing discs are interleavely disposed among the gain medium segments to provide face cooling for the gain medium segments during the operation of the laser system.

18 Claims, 1 Drawing Sheet

001
METHOD AND APPARATUS FOR COOLING SEMICONDUCTOR PUMPED LASERS

BACKGROUND OF THE INVENTION

1. Technical Field

The present invention relates to semiconductor lasers in general, and in particular to static semiconductor pump lasers. Still more particularly, the present invention relates to a method and apparatus for cooling static semiconductor pump lasers.

2. Description of the Related Art

A laser is capable of producing monochromatic, coherent light through the stimulated emission of photons from atoms, molecules or ions of an active gain medium by an input of energy. A laser includes a resonator that is typically defined by two highly reflecting surfaces for forming a closed round trip path for light to travel. The active gain medium is resided within the resonator.

If a population inversion is created by an excitation of the active gain medium, the spontaneous emission of a photon from an excited atom, molecule or ion undergoing transition to a lower energy state can stimulate an emission of photons of substantially identical energy from other excited atoms, molecules or ions. As a result, the initial photon creates a cascade of photons between the reflecting surfaces of the resonator that are of substantially identical energy and exactly in phase. A portion of the cascade of photons is then discharged out of the resonator, for example, by transmission through one of the two reflecting surfaces of the resonator. Such discharged photons constitute a laser output.

The excitation of an active gain medium within a laser can be accomplished by a variety of methods, with optical pumping being the most common. Recent advances in pump diode technology enables intensely bright fiber-based pump sources to be formed. Such fiber-based pump source is capable of delivering at lease 10 kW absorbed intensities. As a result, rare ion lasers can operate at near quasi-3 levels. At such absorbed energy densities, however, thermal aberrations increase to a point that will impact beam qualities and overall heating levels.

Many attempts have been made to provide a more intimate cooling path to avoid the above-mentioned problems, but none yields a satisfactory result. Consequently, it would be desirable to provide an improved method and apparatus for cooling high intensity pump lasers.

SUMMARY OF THE INVENTION

In accordance with a preferred embodiment of the present invention, a laser system includes a resonator, a gain medium and multiple heat-absorbing discs. The resonator is formed by a first mirror and a second mirror. The gain medium, which is contained within the resonator, is collectively formed by a group of gain medium segments. Each of the gain medium segments is preferably in the shape of a cylindrical disc. The heat-absorbing discs are interleavely disposed among the gain medium segments to provide face cooling for the gain medium segments during the operation of the laser system.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
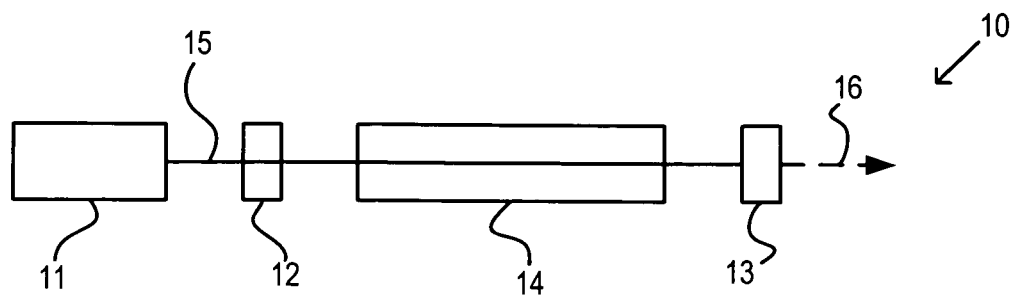
FIG. 1 is a block diagram of a pumped laser in which a preferred embodiment of the present invention can be incorporated.

Referring now to the drawings and in particular to FIG. 1, there is illustrated a block diagram of a pumped laser in which a preferred embodiment of the present invention can be incorporated. As shown, a pumped laser 10 includes a semiconductor laser pump source 11, a resonator formed by a first mirror 12 and a second mirror 13, and an active gain medium 14. Active gain medium 14 is resided within the resonator between mirrors 12 and mirror 13.

Laser pump source 11 is capable of generating a pump beam 15. Pump beam 15 can be directed into active gain medium 14 through first mirror 12. The axis of the resonator formed by mirrors 12 and 13 is substantially co-aligned with pump beam 15. The curvatures of, and spacing between, mirrors 12 and 13 are selected to maximum the overlap between the volume of excitation of pump beam 15 in active gain medium 14 and the desired mode volume of the resonator. The portion of pump beam 15 not absorbed in a first pass through active gain medium 14 is passed back through active gain medium 14 for a second pass upon reflection from mirror 13. Some portion of pump beam 15 is subsequently output through mirror 13 as a laser beam 16.

Figure 2:
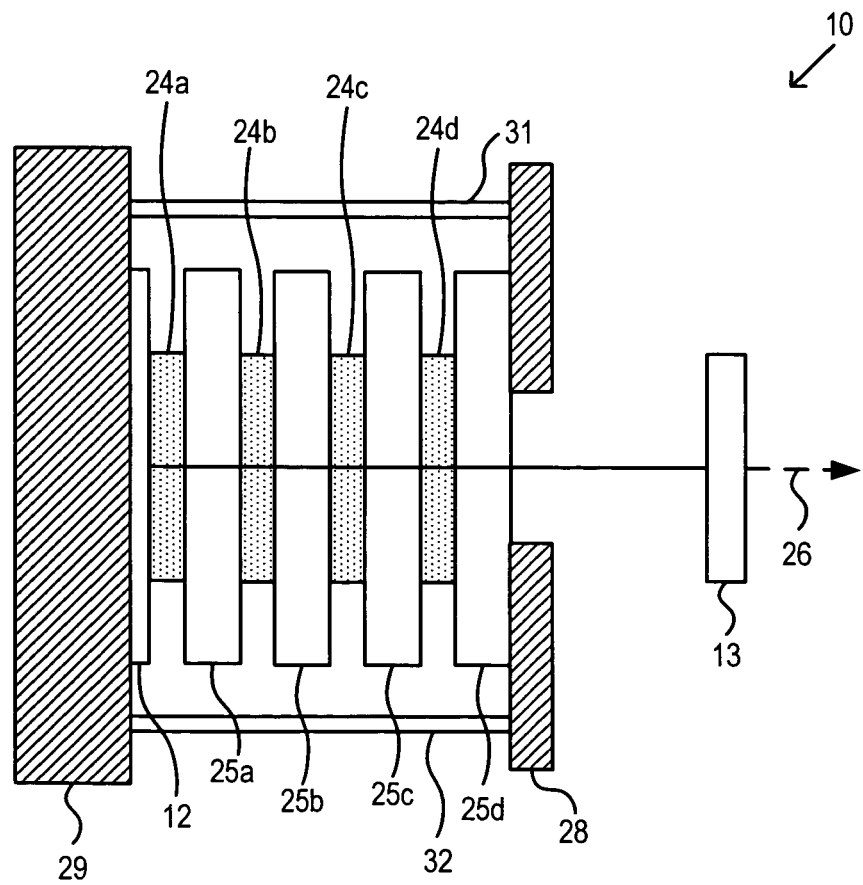
FIG. 2 is a diagram of an apparatus for cooling the pumped laser from FIG. 1, in accordance with a preferred embodiment of the present invention.

With reference now to FIG. 2, there is depicted a diagram of an apparatus for cooling pumped laser 10, in accordance with a preferred embodiment of the present invention. As shown, a resonator is formed by mirror 12 and mirror 13 within pump laser 10. Contained within the resonator is an active gain medium collectively formed by gain medium segments 24a-24d. Gain medium segments 24a-24d are preferably in cylindrical discs formed by laser crystals such as yitteri aluminum garnet (Nd:YAG) and Tm:YAG. Gain medium segments 24a-24d are interlaced with heat-absorbing discs 25a-25d. During the operation of pump laser 10, heat-absorbing discs 25a-25d dissipate heat for gain medium segments 24a-24d. Pump laser 10 is capable of generating a laser beam 26 output from mirror 13.

A pair of metal discs 28 and 29 along with rods 31 and 32 are utilized to clamp heat-absorbing discs 25a-25d and gain medium segments 24a-24d together such that heat-absorbing discs 25a-25d are in optical contact with gain medium segments 24a-24d at all times during operation. Basically, metal discs 28 and 29 along with rods 31 and 32 function as a vise for holding heat-absorbing discs 25a-25d and gain medium segments 24a-24d tightly together with each other. Metal discs 28 and 29 are preferably made of copper or other highly thermal conductive metals.

Heat-absorbing discs 25a-25d can be made of sapphire, zinc selenium (ZnSe) or calcium fluoride ($CaF_2$). For the present embodiment, heat-absorbing discs 25a-25d are in equal thickness. However, each of heat-absorbing discs 25a-25d can be tailored with different absorption coefficients and thicknesses to direct the position and amplitude of deposited heat. In addition, each of gain medium segments 24a-24d can be designed to operate at an optimum face cooling merit value. Preferably, the diameter of each of gain medium segments 24a-24d is at least three times longer than the length of each of gain medium segments 24a-24d.

For the present embodiment, heat-absorbing disc 25a is disposed between gain medium segment 24a and gain medium segment 24b, heat-absorbing disc 25b is disposed between gain medium segment 24b and gain medium segment 24c, heat-absorbing disc 25c is disposed between gain medium segment 24c and gain medium segment 24d, and heat-absorbing disc 25d is disposed between gain medium segment 24d and metal disc 28. Although four heat-absorbing discs and four gain medium segments are used in the present embodiment, it is understood by those skilled in the art that any number of heat-absorbing discs and gain medium segments can be used.

As has been described, the present invention provides an improved method and apparatus for cooling a static semiconductor pumped laser. The face cooling method provided by the present invention is more effective than the surface cooling method that is typically found in the prior art laser systems.

While the invention has been particularly shown and described with reference to a preferred embodiment, it will be understood by those skilled in the art that various changes in form and detail may be made therein without departing from the spirit and scope of the invention.

What is claimed is:

1. A laser system comprising:
   a resonator formed by a first mirror and a second mirror;
   an active gain medium contained within said resonator, wherein said active gain medium is collectively formed by a plurality of gain medium segments, wherein the diameter of one of said gain medium segments is at least three times longer than the length of said one gain medium segment; and
   a plurality of heat-absorbing discs interleavedly disposed among said plurality of gain medium segments and only contacting said plurality of gain media segments to provide face cooling for said plurality of gain medium segments during an, operation of said laser system, wherein all of said plurality of gain medium segments are in face contact across all of their cross-sectional areas with surfaces of said heat-absorbing discs at all temperatures, wherein said face cooling is performed without using additional conductors.

2. The laser system of claim 1, wherein said heat-absorbing discs and said gain medium segments are held together by a pair of metal discs such that said heat-absorbing discs are in optical contact with said gain medium segments at all times during operation.

3. The laser system of claim 2, wherein said metal discs are made of copper.

4. The laser system of claim 1, wherein said gain medium segments are made of Nd:YAG.

5. The laser system of claim 1, wherein said gain medium segments are made of Tm:YAG.

6. The laser system of claim 1, wherein said heat-absorbing discs are made of sapphire.

7. The laser system of claim 1, wherein said heat-absorbing discs are made of zinc selenium.

8. The laser system of claim 1, wherein said heat-absorbing discs are made of calcium fluoride.

9. The laser system of claim 1, wherein said heat-absorbing discs are of equal thickness.

10. A method for cooling a pump laser, said method comprising:
    forming a resonator by a first minor and a second mirror;
    placing an active gain medium within said resonator, wherein said active gain medium is collectively formed by a plurality of gain medium segments, wherein the diameter of one of said gain medium segments is at least three times longer than the length of said one gain medium segment; and
    interleavedly disposing a plurality of heat-absorbing discs among said plurality of gain medium segments to provide face cooling for said plurality of gain medium segments during an operation of said pump laser, wherein all of said plurality of gain medium segments are in face contact across all of their cross-sectional areas with surfaces of said heat-absorbing discs at all temperatures, wherein said plurality of heat-absorbing discs only contact said plurality of gain media segments, wherein said face cooling is performed without using additional conductors.

11. The method of claim 10, wherein said method further includes clamping said heat-absorbing discs and said gain medium segments together by a pair of metal discs such that said heat-absorbing discs are in optical contact with said gain medium segments at all times during operation.

12. The method of claim 11, wherein said metal discs are made of copper.

13. The method of claim 10, wherein said gain medium segments are made of Nd:YAG.

14. The method of claim 10, wherein said gain medium segments are made of Tm:YAG.

15. The method of claim 10, wherein said heat-absorbing discs are made of sapphire.

16. The method of claim 10, wherein said heat-absorbing discs are made of zinc selenium.

17. The method of claim 10, wherein said heat-absorbing discs are made of calcium fluoride.

18. The method of claim 10, wherein said heat-absorbing discs are of equal thickness.

* * * * *